(12) United States Patent
Wang et al.

(10) Patent No.: US 10,175,852 B2
(45) Date of Patent: Jan. 8, 2019

(54) INFORMATION PROCESSING METHODS AND ELECTRONIC DEVICES FOR CLASSIFYING APPLICATIONS

(71) Applicant: LENOVO (BEIJING) LIMITED, Beijing (CN)

(72) Inventors: Gaoge Wang, Beijing (CN); Kai Kang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 442 days.

(21) Appl. No.: 14/227,841

(22) Filed: Mar. 27, 2014

(65) Prior Publication Data
US 2015/0058766 A1 Feb. 26, 2015

(30) Foreign Application Priority Data
Aug. 23, 2013 (CN) .......................... 2013 1 0373826

(51) Int. Cl.
*G06F 3/0481* (2013.01)
*G06F 3/0482* (2013.01)
(Continued)

(52) U.S. Cl.
CPC .......... *G06F 3/0482* (2013.01); *G06F 3/0486* (2013.01); *G06F 3/0488* (2013.01); *G06F 3/04817* (2013.01)

(58) Field of Classification Search
CPC ............. G06F 3/04817; G06F 3/04886; G06F 3/0486; G06F 9/4443; G06F 17/30265
See application file for complete search history.

(56) References Cited

U.S. PATENT DOCUMENTS

| 6,046,739 A * | 4/2000 | MacPhail .............. G06F 3/0481 715/767 |
| 2004/0090452 A1* | 5/2004 | Schmidt ............... G11B 27/034 715/716 |

(Continued)

FOREIGN PATENT DOCUMENTS

| CN | 1773492 A | 5/2006 |
| CN | 102135992 A | 7/2011 |

(Continued)

OTHER PUBLICATIONS

AnandTech forum, "Android: auto-organize apps into folders?" various posts ca. Jan. 13, 2012 <URL=https://forums.anandtech.com/threads/androidautoorganizeappsintofolders. 2219584/>.*

(Continued)

*Primary Examiner* — Christopher J Fibbi
*Assistant Examiner* — James T Tsai
(74) *Attorney, Agent, or Firm* — Kinney & Lange, P.A.

(57) ABSTRACT

Information processing methods and electronic devices are provided. The method is applicable in an electronic device, which includes a display unit, M applications being installed in the electronic device, each of the M applications having an application logo, M application logos corresponding to the M applications respectively, M being an integer no less than 2. The method includes: obtaining attribute information of N applications corresponding to N application logos of the M application logos, when the N application logos are located in a first folder; determining K application logos of M-N application logos complying with a predetermined rule, based on the attribute information of the N programs and the predetermined rule; outputting prompt information when the N application logos are displayed on the display unit by the first folder responding to a trigger instruction, the (Continued)

prompt information prompting that the K application logos can be moved into the first folder.

6 Claims, 5 Drawing Sheets

(51) Int. Cl.
 *G06F 3/0486* (2013.01)
 *G06F 3/0488* (2013.01)

(56) References Cited

U.S. PATENT DOCUMENTS

| | | | | |
|---|---|---|---|---|
| 2005/0010593 | A1* | 1/2005 | Fellenstein | G06F 17/30067 |
| 2007/0255745 | A1* | 11/2007 | Gargi | G06F 17/30265 |
| 2008/0184112 | A1* | 7/2008 | Chiang | G06F 3/04817 715/700 |
| 2008/0218808 | A1 | 9/2008 | Van Den Berge | |
| 2008/0229222 | A1* | 9/2008 | Kake | G06F 3/0481 715/764 |
| 2009/0113330 | A1* | 4/2009 | Garrison | G06F 3/0486 715/769 |
| 2010/0169828 | A1* | 7/2010 | Kho | G06F 9/4443 715/810 |
| 2010/0222112 | A1* | 9/2010 | Han | G06F 3/04883 455/566 |
| 2010/0313124 | A1* | 12/2010 | Privault | G06F 3/04812 715/702 |
| 2011/0252372 | A1* | 10/2011 | Chaudhri | G06F 3/04817 715/835 |
| 2011/0252375 | A1* | 10/2011 | Chaudhri | G06F 3/04817 715/835 |
| 2011/0258582 | A1* | 10/2011 | Bang | G06F 3/04817 715/811 |
| 2012/0084692 | A1* | 4/2012 | Bae | G06F 3/04817 715/769 |
| 2012/0092346 | A1* | 4/2012 | Ording | G06F 3/0481 345/473 |
| 2013/0055127 | A1* | 2/2013 | Saito | G06F 3/0486 715/769 |
| 2013/0097560 | A1* | 4/2013 | Park | G06F 3/04817 715/811 |
| 2013/0117271 | A1 | 5/2013 | Zhang | |
| 2013/0132896 | A1* | 5/2013 | Lee | G06Q 10/10 715/808 |
| 2013/0219319 | A1* | 8/2013 | Park | G06F 3/0488 715/775 |
| 2013/0254719 | A1* | 9/2013 | Hanazaki | G06F 3/04817 715/846 |
| 2014/0201655 | A1* | 7/2014 | Mahaffey | G06F 3/04817 715/765 |
| 2014/0380214 | A1* | 12/2014 | Huang | G06F 3/0486 715/769 |
| 2015/0006538 | A1* | 1/2015 | Koike | G06F 3/0486 707/740 |

FOREIGN PATENT DOCUMENTS

| | | | |
|---|---|---|---|
| CN | 102364438 A | | 2/2012 |
| CN | 102637178 A | | 8/2012 |
| CN | 102681828 A | | 9/2012 |
| KR | 20140113096 A | * | 9/2014 |

OTHER PUBLICATIONS

Second Chinese Office Action, for Chinese Patent Application No. 201310373826.8, dated Oct. 24, 2017, 7 pages.

* cited by examiner

INFORMATION PROCESSING METHODS AND ELECTRONIC DEVICES FOR CLASSIFYING APPLICATIONS

TECHNICAL FIELD

The present disclosure relates to a field of electronic techniques, and particularly, to information processing methods and electronic devices.

BACKGROUND

With development of sciences and technologies, functions of e.g. a smart phone, a tablet computer are becoming richer and richer, such as playing game, working, playing audio and video, chatting etc. One similar function may be installed in a plurality of different applications. For example, a user may install a plurality of game applications, a plurality of video playing programs. Therefore, the user needs to create a folder, in which application logos of one and the same category of applications may be collectively placed, so that the user may find the applications rapidly, and display by a display unit of the electronic device may be organized better.

The folder may be created on a host page of a portable electronic device. Then, a logo of any of the applications may be moved by manual operation of the user to the folder from the host page. For example, the games such as Tetris, Pair-Up, QQ Game, Legend etc. may be installed in the portable electronic device. In this case, a folder may be created at a first position on the host page, named as "Game". Then, the user may look for a logo for Tetris at a second position on the host page. The logo of Tetris may be moved into the folder "Game" by moving the logo of Tetris from the second position to the first position. Similarly, the logos of other game programs are moved into the folder "Game" only if they are dragged one by one in response to the manual operations of the user on the portable electronic device.

However, the inventor found at least a technical problem in the above techniques as follows during implementation of technical solutions in embodiments of the present disclosure.

The applications are manually classified by the user judging a category of the application. Therefore, there is a technical problem of missing the applications and classifying the applications erroneously during the applications are classified.

The logo corresponding to the application is moved into the folder only if the user performs a sliding operation from a position where the logo of the application is located to a position where the folder is located. When it is needed to move the plurality of application into one folder, the user must drag the logos of the applications one by one. If the logos of the plurality of applications are distributed over different positions of different pages, the applications must be classified to the folder one by one. If the logo of the application is located on a page different from the page where the folder is located, it is not convenient for the dragging operation. Therefore, the technical solution is complex and time consuming for the process of classifying the applications into the folder.

SUMMARY

Embodiments of the present application provide information processing methods and electronic devices, solving a technical problem of missing applications and classifying applications erroneously during the applications are classified, and achieving a technical effect of accurately judging a category of the application and recommending classification. Therefore, the applications may be classified more accurately and more completely.

An embodiment of the present application provides an information processing method applied in an electronic device, the electronic device including a display unit, M applications being installed in the electronic device, each of the M applications having an application logo, M application logos corresponding to the M applications respectively, M being an integer no less than 2, the method including:

obtaining attribute information of N applications corresponding to N application logos of the M application logos, when the N application logos are located in a first folder;

determining K application logos of M–N application logos complying with a predetermined rule, based on the attribute information of the N programs and the predetermined rule;

outputting prompt information when the N application logos are displayed on the display unit by the first folder responding to a trigger instruction, the prompt information prompting that the K application logos can be moved into the first folder.

Preferably, outputting prompt information when the N application logos are displayed on the display unit by the first folder responding to a trigger instruction particularly includes: displaying, on the display unit, the N application logos and K tag items corresponding to the K application logos, when the first folder responds to the trigger instruction.

Preferably, after the K tag items corresponding to the K application logos are displayed on the display unit, the method further includes: obtaining a manipulation operation on the K tag items; and moving the K application logos to the first folder and displaying the K application logos at positions corresponding to the K tag items, in response to the manipulation operation.

Preferably, displaying the K tag items corresponding to the K application logos on the display unit is particularly: displaying the K tag items on the display unit with a first display effect.

Preferably, moving the K application logos to the first folder and displaying the K application logos at the positions corresponding to the K tag items is particularly: moving the K application logos to the first folder, and displaying the K application logos at the positions corresponding to the K tag items with a second display effect, the second display effect being different from the first display effect.

Preferably, before the K tag items are displayed on the display unit with the first display effect, the method further includes: determining the first display effect based on an object category in the first folder, so that the first display effect is matched with the object category in the first folder.

Preferably, the predetermined rule is particularly: having the same attribute information as that of P applications of the N applications, in which P is a preset proportion of N and is a positive integer no more than N.

On the other hand, An embodiment of the present disclosure electronic device including a display unit, M applications being installed in the electronic device, each of the M applications having an application logo, M application logos corresponding to the M applications respectively, M being an integer no less than 2, the electronic device including: a first obtaining unit configured for obtaining attribute information of N applications corresponding to N application logos of the M application logos, when the N application logos are located in a first folder; a first determination unit configured for determining K application logos of M−N application logos complying with a predetermined rule, based on the attribute information of the N programs and the predetermined rule; an output unit configured for outputting prompt information when the N application logos are displayed on the display unit by the first folder responding to a trigger instruction, the prompt information prompting that the K application logos can be moved into the first folder.

Preferably, the output unit is particularly configured for displaying, on the display unit, the N application logos and K tag items corresponding to the K application logos, when the first folder responds to the trigger instruction.

Preferably, the electronic device further includes: a second obtaining unit configured for obtaining a manipulation operation on the K tag items; and a movement unit configured for moving the K application logos to the first folder and displaying the K application logos at positions corresponding to the K tag items, in response to the manipulation operation.

Preferably, the output unit is particularly configured for displaying the K tag items on the display unit with a first display effect.

Preferably, the movement unit is particularly configured for moving the K application logos to the first folder, and displaying the K application logos at the positions corresponding to the K tag items with a second display effect, the second display effect being different from the first display effect.

Preferably, the electronic device further includes a second determination unit configured for determining the first display effect based on an object category in the first folder, so that the first display effect is matched with the object category in the first folder.

Preferably, the first determination unit is particularly configured for determining the K application of the N application which have the same attribute information as that of P applications of the N applications, in which P is a preset proportion of N and is a positive integer no more than N.

One or more technical solutions provided in the embodiments of the present application have at least technical effects or advantages as follows.

1. With the technical means of obtaining attribute information of N applications corresponding to N application logos of the M application logos, when the N application logos are located in a first folder; determining K application logos of M−N application logos complying with a predetermined rule, based on the attribute information of the N programs and the predetermined rule; outputting prompt information when the N application logos are displayed on the display unit by the first folder responding to a trigger instruction, so as to prompt that the K application logos can be moved into the first folder, it may be avoid that the category of the application needs to be judged artificially. Therefore, the technical solution of missing the applications and classifying the applications erroneously during the applications are classified may be effectively solved, and thus the technical effect of accurately judging the category of the application and recommending classification may be achieved. Consequently, the applications may be classified more accurately and completely.

2. Further, with the technical solution of obtaining the manipulation operation on the K tag items after the prompt information is output, the prompt information including the K tag items corresponding to the K application logos movable to the folder; moving the K application logos to the first folder and displaying the K application logos at the positions corresponding to the K tag items, in response to the manipulation operation, an icon corresponding to the application may be moved into the first folder by only a click operation on the K tag items. Therefore, the technical problem of the process for moving the applications to the folder is complex and time consuming may be solved effectively, and thus the technical effect of rapidly moving the applications to the folder for classification. Consequently, the classification of the applications may be more convenient and facilitative.

3. Further, since it is judged whether the M−N applications and the P applications of the N applications having been located in the first folder have the same attribute information (P is a preset proportion of N), at least applications belonging to the same category as that of the P applications may be determined. Therefore, the applications that may be added to the first folder can be prompted to the user more accurately.

DETAILED DESCRIPTION

Embodiments of the present application provide an information processing method and an electronic device for solving a technical problem of missing applications and classifying the applications erroneously during the applications are classified.

In the embodiments of the present application, technical schemes are proposed as follows for solving the above technical problem of missing the applications or classifying the applications erroneously during the applications are classified.

Attribute information of N applications corresponding to N application logos of the M application logos is obtained, when the N application logos are located in a first folder. K application logos of M−N application logos complying with a predetermined rule are determined based on the attribute information of the N programs and the predetermined rule. Prompt information is output when the N application logos are displayed on the display unit by the first folder responding to a trigger instruction, the prompt information prompting that the K application logos can be moved into the first folder.

The K application logos that can be moved into the first folder may be judged according to the predetermined rule. Then, the prompt information may be provided to the user, prompting that the K application logos corresponding to the K applications can be moved into the first folder. Therefore, such a scheme may solve the technical problem of missing the applications and classifying the applications erroneously during the applications are classified. And the technical effect of accurately judging the category of the application and recommending classification. Therefore, the applications may be classified more accurately and more completely.

Hereinafter, the above technical solutions will be described in detail in connection with the drawings and particular embodiments, in order to better understand the above technical solutions.

On one hand, an embodiment of the present disclosure provides an information processing method applied in an electronic device. In an specific implementation, the electronic device may particularly be a smart phone, a tablet computer etc. The electronic device includes a display unit, M applications being installed in the electronic device, each of the M applications having an application logo, M application logos corresponding to the M applications respectively. M may be 2, 3, 4, 5 . . . . For example, three applications may be installed in the electronic device: a dialing application, a camera application, a message application. Thus, a dialing application icon, a camera application icon and a message application icon may be displayed on the display unit.

Figure 1:
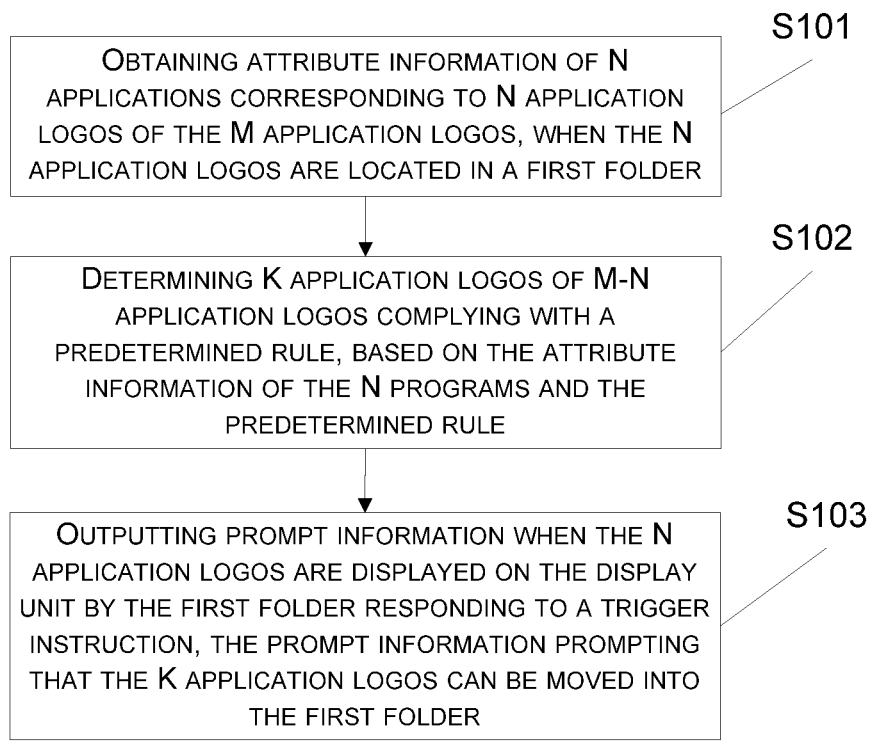
FIG. 1 shows a flowchart of an information processing method provided in an embodiment of the present application.

As shown in FIG. 1, the method may include: Step S101, obtaining attribute information of N applications corresponding to N application logos of the M application logos, when the N application logos are located in a first folder; Step S102, determining K application logos of M-N application logos complying with a predetermined rule, based on the attribute information of the N programs and the predetermined rule; Step S103, outputting prompt information when the N application logos are displayed on the display unit by the first folder responding to a trigger instruction, the prompt information prompting that the K application logos can be moved into the first folder.

Hereinafter, the technical solution in the embodiment of the present application will be described in detail with reference to FIG. 1.

In a specific implementation, it is assumed that the user needs to classify a plurality of applications belonging to one and the same category into the first folder. Therefore, before step S101, the first folder may be created firstly based on the manual operation of the user. Next, a sliding operation may be performed for dragging the N application logos corresponding to the N applications to the position where the first folder is located one by one. The electronic device may move the N application logos into the first folder in response to the sliding operation of the user. In particular, in order to output the prompt information accurately, N is no less than 2. That is, the user needs to move at least two icons corresponding to the two applications of the same category into the first folder. Of course, in the specific implementation, in order to improve accuracy of application classification, the number of the application icons needed to be judged manually and moved to the first folder may be increased according to actual requirements. The present application does not make any limitation on this point.

When the N application icons corresponding to the N application are located in the first folder, step S101 may be performed, i.e., when the N application icons corresponding to the N application are located in the first folder, the attribute information of the N applications corresponding to the N application logos may be obtained.

In particular, the obtained attribute information may include a developer of the N applications; a series number of the application; a function type of the application, such as a game, a browser or a player; a hardware type of the electronic device occupied by the application, e.g., requiring a camera, a microphone or a gravity sensor etc; whether the application needs to connect the internet etc. In a specific implementation, the attribute information of the N applications may be detected by detecting an installation data packet, or the attribute information may be obtained by the user's usage state. For example, assuming that the user is conducting a video communication via QQ, it is illustrated that the QQ program needs a microphone. The present application does not make any limitation on this point.

After step S101, step S102 may be performed, i.e., the K application logos of M-N application logos complying with a predetermined rule may be determined based on the attribute information of the N programs and the predetermined rule.

In particular, the predetermined rule may be: having the same attribute information as that of the P applications of the N applications, in which P is a preset proportion of N and is a positive integer no more than N.

In a specific implementation, it may be detected whether each of the M-N applications corresponding to the M-N application icons has the same attribute information as that of the N applications in the first folder, and the K applications having the same attribute information as that of the N applications may be determined, so as to determine the K application logos complying with the predetermined rule among the M-N application logos. The M-N applications are applications not located in the first folder currently, particularly, may be located on the host page or in other folder(s) than the first folder. For example, according to the attribute information of the N applications obtained in step S101, all or most of the N applications in the first folder need to use the camera. Thus, it may be judged whether each of the M-N applications needs to use the camera, so as to determine the K applications of the M-N applications which need to use the camera. For another example, according to the attribute information of the N applications obtained in step S101, all or most of the N applications in the first folder are browsers. Thus, it may be judged whether each of the M-N applications is the browser, so as to determine the K applications of the M-N applications which function as the browser. Thus, the K tag items complying with the predetermined rule may be determined sequentially.

After step S102, step S103 may be performed, i.e., the prompt information may be output when the N application logos are displayed on the display unit by the first folder responding to the trigger instruction. The prompt information may be used for prompting that the K application logos can be moved into the first folder.

In a specific implementation, the trigger instruction is an instruction generated when the first folder is opened. In this case, when the user clicks the first folder, the electron device may generate the trigger instruction of outputting the prompt information, in response to the user's touch and click operation. The electronic device may display, on the display unit, the N application logos and the K tag items corresponding to the K application logos, in response to the trigger instruction. The user may be prompted that the K application logos corresponding to the K tag items may be moved into the first folder.

In particular, the N application logos may be displayed with a second display effect, and the K tag items may be displayed with a first display effect, representing that the K application logos corresponding to the K tag items are not located at the positions. A corresponding application cannot be enabled based on the tag item, but the K application logos may be moved into the first folder. The second display effect is to display the N application logos having been located in the first folder. In particular, the first display effect is different from the second display effect. For example, the K tag items use black-and-white logos for display, the N application logos are displayed in colorful logos, or display brightness of the K tag items and the N application logos are not the same etc. However, the above examples are not intended to limit the present disclosure, but only for illustration. In a specific implementation, it is only required that there is difference between the first display effect and the second display effect.

Further in a specific implementation, after the K tag items corresponding to the K application logos are displayed on the display unit, the manipulation operation on the K tag items may be obtained. In response to the manipulation operation, the K application logos may be moved into the first folder, and the K application icons may be displayed at the positions corresponding to the K tag items with the second display effect.

In particular, the K application logos may be moved into the first folder, and the K application icons may be displayed at the positions corresponding to the K tag items with the second display effect, thus the K applications corresponding to the K application logos may be enabled based on the K application logos. The display effect after the K application logos are moved into the first folder may be consistent with the display effect of the N application logos.

Further in a specific implementation, each tag item of the K application corresponds to a display area in which a display object is displayed. A display object of the application logo corresponding to the display object has the same icon. For example, both the application logo of the message application and the display object of the corresponding message tag item are the message icons only with different brightness or colors etc. Similarly, other tag items correspond to icons of the application logos related to the tag items, respectively.

Further in a specific implementation, the first display effect may be determined based on the object category in the first folder, so that the first display effect is matched with the object category in the first folder.

In particular, the first folder is a browser folder, and the display objects displayed by the K tag items correspond to the icons identified by the browsers. When the first folder is a game folder, the display objects displayed by the K tag items correspond to the icons identified by the games. Therefore, different folder types of the first folder may cause different tag items displayed, so as to be matched with the folder type of the first folder. For example, if a displayed tag item corresponds to an application logo of a "Linking" game, the display object of the tag item is an icon of the "Linking" game logo, so as to prompt the game application corresponding to the tag item to the user.

Assuming that a plurality of applications, e.g. 20 applications such as a QQ application, Wechat, Browser A, Browser B, Browser C, Browser D, Browser E, Browser F, a dialing application, a message application etc., are installed in the smart phone of the user Wang, and distributed over three host pages. Therefore, Wang wants to classify all of the browser applications into one folder for his convenient usage.

Figure 3:
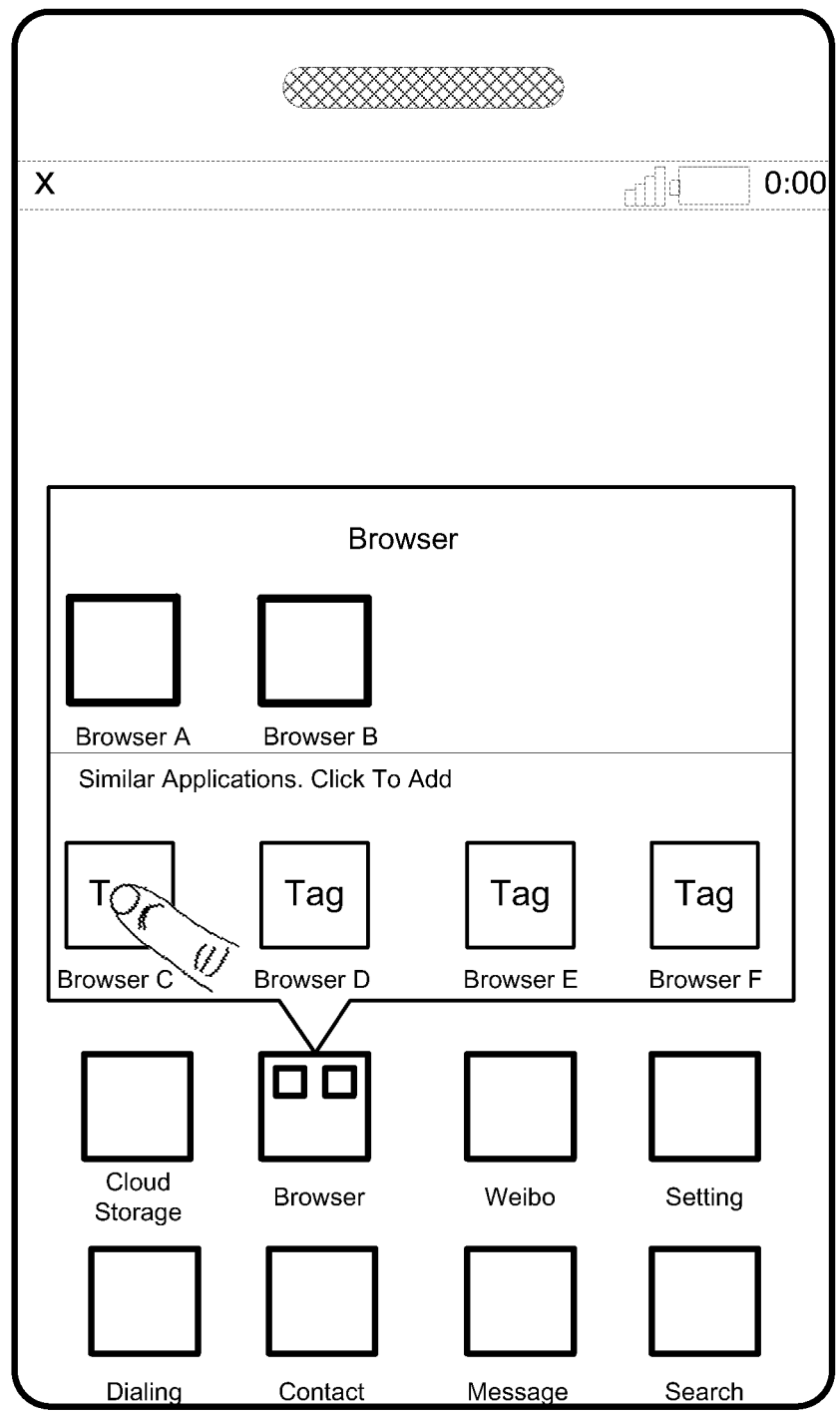
FIG. 3 shows a schematic diagram of outputting prompt information and adding an application based on the prompt information in an embodiment of the present application.
Figure 4:
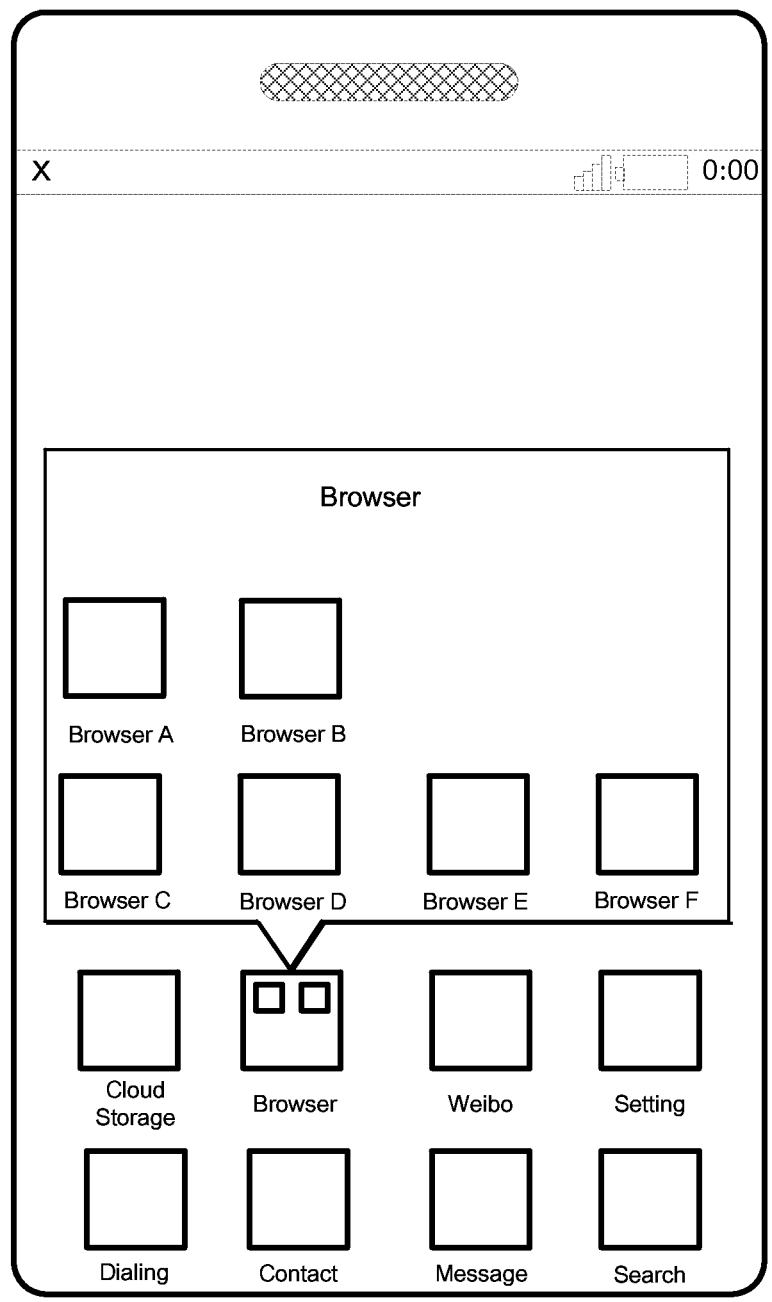
FIG. 4 shows an effect diagram of adding a recommended application to a browser folder in an embodiment of the present application.

Hereinafter, the above assumption may be taken as an example for illustrating the technical solution in the embodiment of the present application, in connection with FIGS. 2, 3 and 4.

Figure 2:
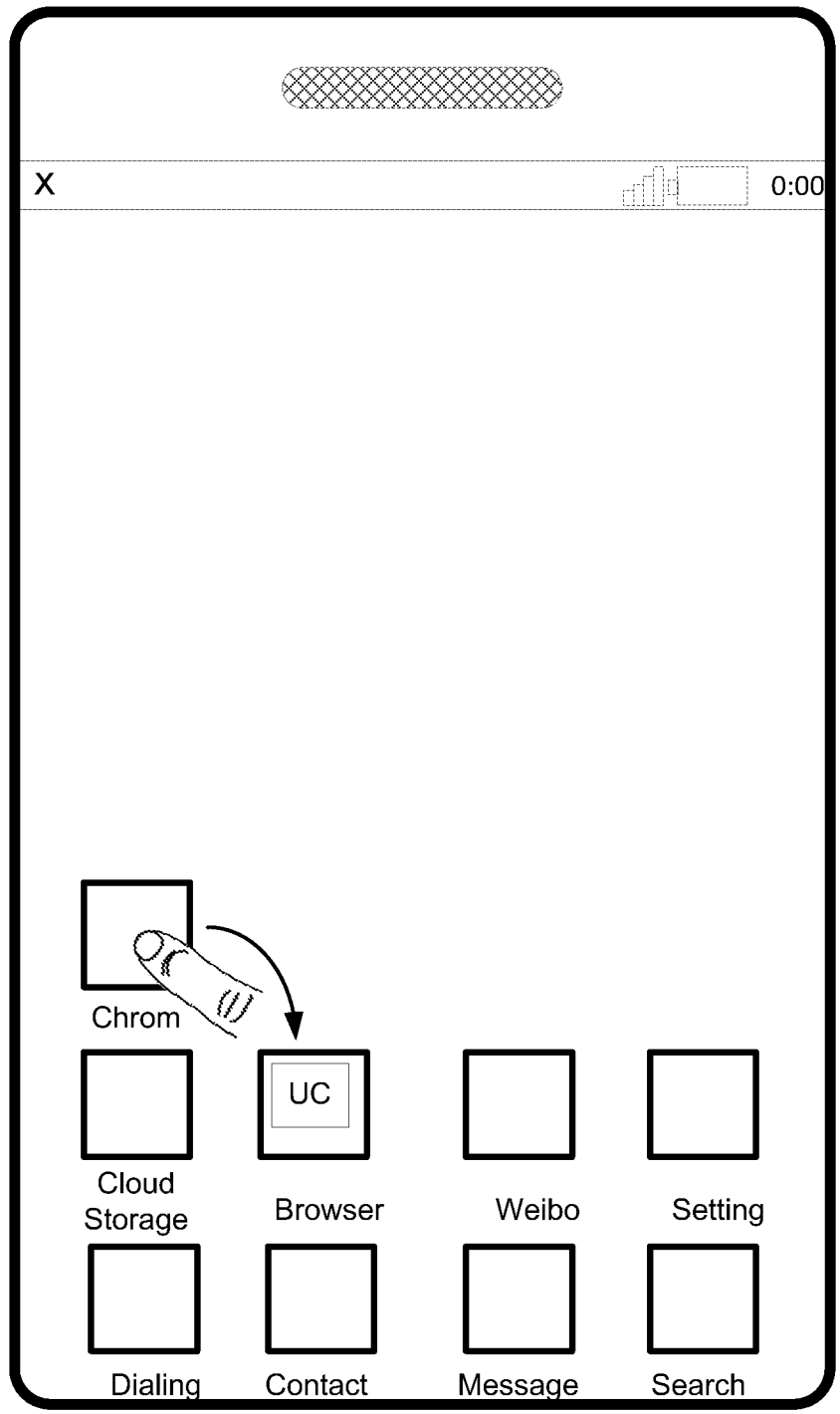
FIG. 2 shows a schematic diagram of creating a browser folder in an embodiment of the present application.

Firstly, as shown in FIG. 2, Wang newly establishes a folder manually, named as "Browser". Browser A and Browser B (e.g. a UC browser and a chrom browser) closest to the folder "Browser" are dragged to the position of the folder "Browser". Browser A and Browser B are moved into the folder "Browser" by the smart phone responding to the dragging operation. The smart phone detects to obtain the attribute information of Browser A and the attribute information of Browser B, and judges whether the applications except Browser A and Browser B have the same attribute information as the UC browser and the chrom browser. Then, it is determined that Browser C, Browser D, Browser E and Browser F in the smart phone have the same attribute information as the UC browser and the chrom browser. Therefore, it may be determined that the browser logos that may be moved to the folder "Browser" include a Browser C logo, a Browser D logo, a Browser E logo and a Browser F logo. When Wang clicks the folder "Browser", a trigger instruction is generated in response to the click operation of the user, and prompt information is output in response to the trigger instruction. As shown in FIG. 3, each of the logos on the display unit corresponds to one display area. The Browser A logo is displayed in one display area with the second display effect, the Browser B logo is displayed in another display area with the second display effect, and the Browser C logo, the Browser D logo, the Browser E logo and the Browser F logo which may be moved to the folder "Browser" may be displayed on the display unit with the first display effect different from the second display effect. Text may prompt the user that the plurality of applications corresponding to the plurality of tag items displayed with the first display effect are applications similar with Browser A and Browser B, and may be added. Wang may move the application logos corresponding to the tag items to the folder "Browser" by clicking the Browser C logo and the Browser D logo etc. displayed with the first display effect. For example, as shown in FIG. 3, if the tag item corresponding to the Browser C logo is clicked, a 360 Browser logo may be added to the folder "Browser". After the Browser C logo, the Browser D logo, the Browser E logo and the Browser F logo are moved into the folder "Browser", their display effects are identical with those of the Browser A logo and the Browser B logo, as shown in FIG. 4.

Based on the same concept of present the disclosure, an embodiment of the present disclosure provides an electronic device. The electronic device includes a display unit, and may be the smart phone, the tablet computer etc. M applications are installed in the electronic device. Each of the M applications has an application logo, M application logos corresponding to the M applications respectively, M being an integer no less than 2.

Figure 5:
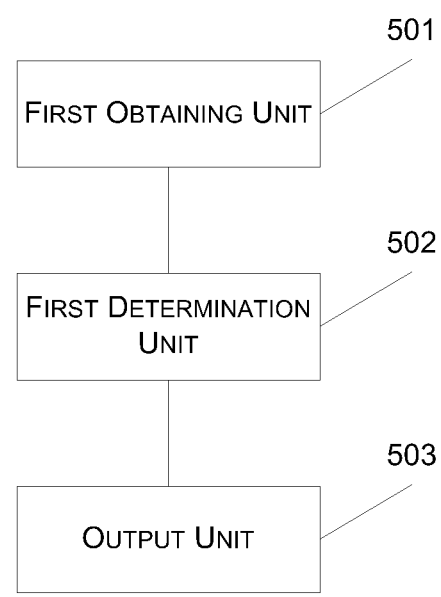
FIG. 5 shows a structure diagram of an electronic device in an embodiment of the present application.

As shown in FIG. 5, the electronic device may include: a first obtaining unit 501 configured for obtaining attribute information of N applications corresponding to N application logos of the M application logos, when the N application logos are located in a first folder; a first determination unit 502 configured for determining K application logos of M–N application logos complying with a predetermined rule, based on the attribute information of the N programs and the predetermined rule; an output unit 503 configured for outputting prompt information when the N application logos are displayed on the display unit by the first folder responding to a trigger instruction, the prompt information prompting that the K application logos can be moved into the first folder.

Further in a specific implementation, the output unit 503 is particularly configured for displaying, on the display unit, the N application logos and K tag items corresponding to the K application logos, when the first folder responds to the trigger instruction.

Further in a specific implementation, the electronic device further includes: a second obtaining unit configured for obtaining a manipulation operation on the K tag items; and a movement unit configured for moving the K application logos to the first folder and displaying the K application logos at positions corresponding to the K tag items, in response to the manipulation operation.

Further in a specific implementation, the output unit is particularly configured for:

displaying the K tag items on the display unit with a first display effect.

Further in a specific implementation, the movement unit is particularly configured for moving the K application logos to the first folder, and displaying the K application logos at the positions corresponding to the K tag items with a second display effect, the second display effect being different from the first display effect.

Further in a specific implementation, the electronic device further includes a second determination unit configured for determining the first display effect based on an object category in the first folder, so that the first display effect is matched with the object category in the first folder.

Further in a specific implementation, the first determination unit is particularly configured for: determining the K application of the N application which have the same attribute information as that of P applications of the N applications, in which P is a preset proportion of N and is a positive integer no more than N.

The electronic device in the present embodiment and the information processing method in the previous embodiment are based on two aspects of the same concept of the present disclosure. The implementation of the method has been described in detail previously. Therefore, the skilled in the art may clearly understand the structure and implementation of the electronic device in the present embodiment according to the previous description, and thus the description thereof will be omitted for conciseness of the specification.

1. With the technical means of obtaining attribute information of N applications corresponding to N application logos of the M application logos, when the N application logos are located in a first folder; determining K application logos of M-N application logos complying with a predetermined rule, based on the attribute information of the N programs and the predetermined rule; outputting prompt information when the N application logos are displayed on the display unit by the first folder responding to a trigger instruction, so as to prompt that the K application logos can be moved into the first folder, it may be avoid that the category of the application needs to be judged artificially. Therefore, the technical solution of missing the applications and classifying the applications erroneously during the applications are classified may be effectively solved, and thus the technical effect of accurately judging the category of the application and recommending classification may be achieved. Consequently, the applications may be classified more accurately and completely.

2. Further, with the technical solution of obtaining the manipulation operation on the K tag items after the prompt information is output, the prompt information including the K tag items corresponding to the K application logos movable to the folder; moving the K application logos to the first folder and displaying the K application logos at the positions corresponding to the K tag items, in response to the manipulation operation, an icon corresponding to the application may be moved into the first folder by only a click operation on the K tag items. Therefore, the technical problem of the process for moving the applications to the folder is complex and time consuming may be solved effectively, and thus the technical effect of rapidly moving the applications to the folder for classification. Consequently, the classification of the applications may be more convenient and facilitative.

3. Further, since it is judged whether the M-N applications and the P applications of the N applications having been located in the first folder have the same attribute information (P is the preset proportion of N), at least applications belonging to the same category as that of the P applications may be determined. Therefore, the applications that may be added to the first folder can be prompted to the user more accurately.

Although preferred embodiments of the present invention have been described, the skilled in the art may make additional variations and modifications on these embodiments once he knows the basic inventive concept. Therefore, the appended claims intend to be explained as including the preferred embodiments and all of variations and modifications falling into the scope of the present invention.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

The invention claimed is:

1. An information processing method applied in an electronic device for improving applications classification, the electronic device comprising a display unit, M applications being installed in the electronic device, each of the M applications having an application logo, M being an integer no less than 2, the method comprising:

obtaining, by the electronic device, attribute information of N applications corresponding to N application logos of M application logos in a first folder, and the attribute information of N applications is used to identify other applications having similar attributes that could also be moved into the first folder, wherein N is an integer no less than 2 and no more than M;

determining, by the electronic device, K application logos of M-N application logos based on the attribute information of the N applications and a predetermined rule;

displaying, by the electronic device, on the display unit, the N application logos with a second display effect representing that the N application logos having been located in the first folder and K tag items together with prompt information when a user clicks the first folder, the K tag items corresponding to the K application logos and being displayed with a first display effect representing that the K application logos corresponding to the K tag items are not located at positions corresponding to the K tag items, and the prompt information prompting that the K application logos can be moved into the first folder, wherein a corresponding application cannot be enabled based on a tag item, but the K application logos may be moved into the first folder, and the first display effect is different from the second display effect wherein display brightness of the K tag items and the N application logos are not the same; and moving, by the electronic device, in response to an operation on at least one of the K tag items, the application logo of the K application logos corresponding to the at least one of the K tag items to the first folder and displaying, by the electronic device, the application logo at the positions corresponding to the at least one of the K tag items, wherein moving, by the electronic device, the K application logos to the first folder and displaying, by the electronic device, the K application logos at the positions corresponding to the K tag items is particularly: moving the K application logos to the first folder, and displaying the K application logos at the positions corresponding to the K tag items with the second display effect, the second display effect being different from the first display effect.

2. The method according to claim 1, further comprising, before the K tag items are displayed on the display unit with the first display effect: determining, by the electronic device, the first display effect based on an object category in the first folder, so that the first display effect is matched with the object category in the first folder.

3. The method according to claim 1, wherein the predetermined rule is particularly: having the same attribute information as that of P applications of the N applications, in which P is a preset proportion of N and is a positive integer no more than N.

4. An electronic device for improving applications classification, comprising a display unit, M applications being installed in the electronic device, each of the M applications having an application logo, M being an integer no less than 2, the electronic device comprising at least one processor, wherein the at least one processor is configured to:

obtain attribute information of N applications corresponding to N application logos of the M application logos in a first folder, and the attribute information of N applications is used to identify other applications having similar attributes that could also be moved into the first folder, wherein N is an integer no less than 2 and no more than M;

determine K application logos of M-N application logos based on the attribute information of the N applications and a predetermined rule;

display, on the display unit, the N application logos with a second display effect representing that the N application logos have been located in the first folder and K tag items together with prompt information when a user clicks the first folder, the K tag items corresponding to the K application logos and being displayed with a first display effect representing that the K application logos corresponding to the K tag items are not located at positions corresponding to the K tag items, and the prompt information prompting that the K application logos can be moved into the first folder, wherein a corresponding application cannot be enabled based on the tag item, but the K application logos may be moved into the first folder; and the first display effect is different from the second display effect wherein display brightness of the K tag items and the N application logos are not the same; and move, in response to an operation on at least one of the K tag items, the application logo of the K application logos corresponding to the at least one of the K tag items to the first folder and display the application logo at positions corresponding to the at least one of the K tag items; and move the K application logos to the first folder, and display the K application logos at the positions corresponding to the K tag items with the second display effect, the second display effect being different from the first display effect.

5. The electronic device according to claim 4, wherein the at least one processor is further configured to, before the K tag items are displayed on the display unit with the first display effect: determine the first display effect based on an object category in the first folder, so that the first display effect is matched with the object category in the first folder.

6. The electronic device according to claim 4, wherein the at least one processor is further configured to: determine the K application of the N application which have the same attribute information as that of P applications of the N applications, in which P is a preset proportion of N and is a positive integer no more than N.

* * * * *